United States Patent [19]

Mensch, Jr.

[11] 4,099,232
[45] Jul. 4, 1978

[54] INTERVAL TIMER ARRANGEMENT IN A MICROPROCESSOR SYSTEM

[75] Inventor: William D. Mensch, Jr., Norriston, Pa.

[73] Assignee: MOS Technology, Inc., Norristown, Pa.

[21] Appl. No.: 723,208

[22] Filed: Sep. 14, 1976

[51] Int. Cl.² .............................................. G06F 1/04
[52] U.S. Cl. .................................................. 364/200
[58] Field of Search .................... 235/92 PE, 92 T; 364/200 MS File

[56] References Cited

U.S. PATENT DOCUMENTS

| | | | |
|---|---|---|---|
| 3,812,472 | 5/1974 | Mahood | 340/172.5 |
| 3,867,614 | 2/1975 | White | 235/92 T |
| 3,878,370 | 4/1975 | Santomango et al. | 235/92 T |

*Primary Examiner*—Raulfe B. Zache
*Attorney, Agent, or Firm*—Cooper, Dunham, Clark, Griffin & Moran

[57] ABSTRACT

An interval timer in a MOS IC microprocessor system uses a countdown register of as many stages as the data bus lines (8) but effectively doubles the capacity of that register, without increasing the number of data bus lines or repetitive loading, by interposing a prescale divide-down register between the system clock and the countdown register. The prescale register divides the system clock by one of several selectable factors equal to non-contiguous powers of two (e.g., by 1, 8, 64 or 1,024) to establish respective prescale time periods (of 1, 8, 64 or 1024 system clocK pulses). One of the several possible prescaling factors is selected by a pair of lines from the system address bus. As a result, the interval timer can be configured with one load operation for an interval within a range which was possible in the prior art only with double the number of data lines and double the length of the countdown register. Chip layout is thus optimized, and the number of control lines needed to access timer functions is reduced, with acceptable loss of flexibility.

2 Claims, 3 Drawing Figures

4,099,232

INTERVAL TIMER ARRANGEMENT IN A MICROPROCESSOR SYSTEM

BACKGROUND AND SUMMARY OF THE INVENTION

The invention is in the field of interval timers, as for microprocessor systems, for example, the microprocessor system sold by MOS Technology, Inc., of Pennsylvania under the generic designation 650X. One typical purpose of an interval timer in such microprocessor systems is to provide an interrupt request to the microprocessor at the expiration of a selected time interval measured by counting a selected number of pulses of the microprocessor system clock. A typical use of an interval timer is to assist an input/output device in periodically sending an interrupt request to the microprocessor, this interrupt request if honored by the microprocessor resulting, for example, in a routine for servicing the input/output device. For flexibility, it must be possible to conveniently change the length of the interval measured by an interval timer. In the prior art known to the inventor, this is done, for example, by loading a countdown register via the data bus of the microprocessor system with a number equal to the number of system clock pulses which must be counted before an interrupt request should issue, and then issuing an interrupt request when the register counts down to zero. It can be appreciated that if the register is to be loaded in one step with an initial number to configure the interval timer, and the interval is to have a sufficiently wide range, the countdown register must be large and it must be accessed by a correspondingly large number of data lines. One common technique known to the inventor is to use a 16-bit countdown register accessed in one load operation by 16 data lines. This, of course, can be done only in microprocessor systems using 16-bit data buses. In microprocessor systems using 8-bit data buses it has been common to use two 8-bit countdown registers and to load them for configuring the interval timer via the same 8-bit bus but in different loading cycles. This, of course, means a delay in configuring an interval timer.

The invention herein provides an interval timer which has a wide interval range and can be configured with a single load operation, and yet needs a relatively low number of data lines and otherwise optimizes chip layout and reduces the number of control lines needed to access timer functions. In a specific illustration of the invention, the interval timer includes an 8-bit programmable countdown register which can be loaded with an 8-bit number via data bus in a single load operation. A prescale divide-down register is interposed between the microprocessor system clock and the programmable countdown register. The prescale register is capable of dividing the system clock by one of several selected factors which are powers of two, e.g., noncontiguous powers of two, such as the factors 1, 8, 64 and 1,024. One of the several possible dividing factors of the prescale register is selected via lines of the address bus, for example, by the two lowest order address bus lines.

In operation, an 8-bit number is loaded into the programmable countdown register via the 8-bit data bus, and at the same time one of the divide factors of the prescale register is selected via the two lowest order address bus lines. This is done in a single load operation. Then the prescale register provides an output pulse with each input clock pulse if the divide factor one has been selected, or provides an output pulse for each 8 clock pulses if the divide factor of 8 has been selected, etc. Each time the prescale register provides an output pulse, i.e., at each prescale time period, the programmable countdown register is decremented by one. When the programmable register counts down through zero, it provides an output pulse which sets an interrupt flag, and the interrupt flag, if not disabled by the microprocessor, provides an interrupt request to the microprocessor.

One advantage of an interval timer in accordance with the invention is that the timer can be configured in a single load operation, thereby avoiding loss of valuable microprocessor time as compared to interval timers having 8-bit buses and using two load cycles. Another advantage is a saving in IC chip layout area while retaining wide timing interval range, because only a relatively low number of bus lines are needed to configure the interval timer (e.g., 8 data bus lines and 2 address bus lines as compared to 16 lines in a prior art interval timer using a 16-bit data bus and a 16-stage countdown register). Stated differently, the interval timer in accordance with the invention reduces the number of control lines needed to access timer functions while saving chip area and minimizing data bus loading.

DETAILED DESCRIPTION

Figure 1:
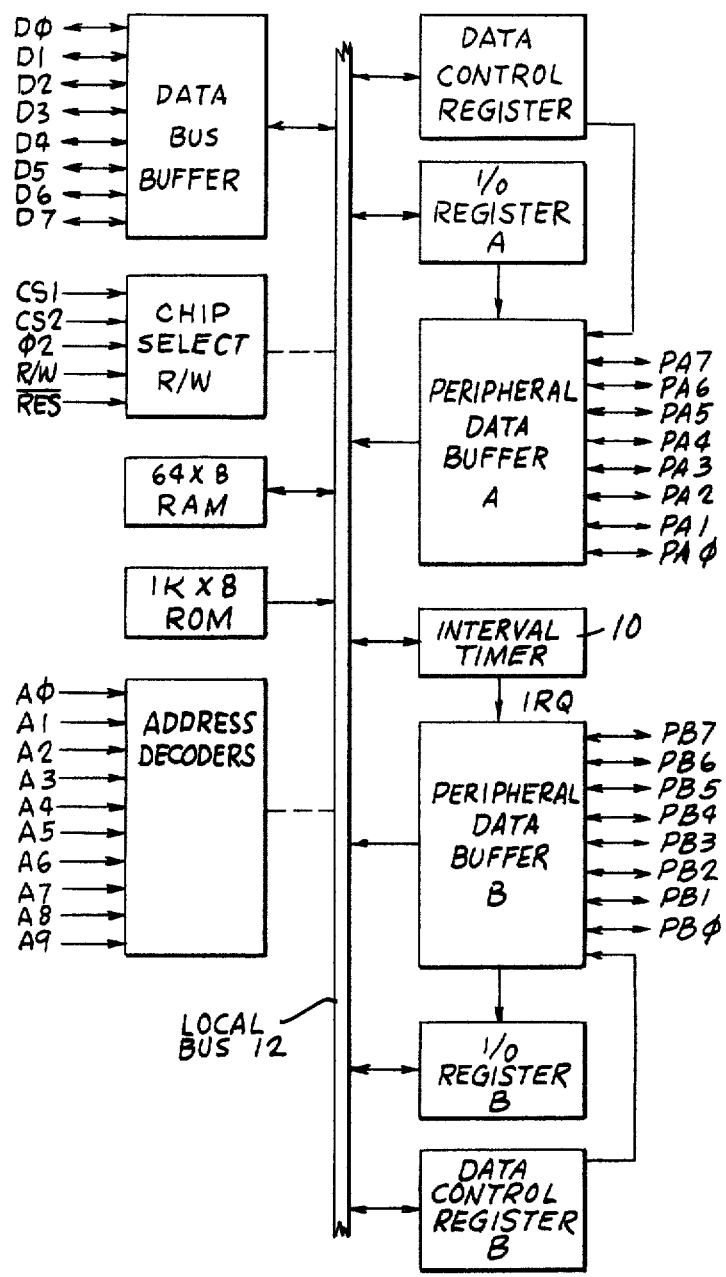
FIG. 1 is a generalized block diagram of a microprocessor system chip including an interval timer in accordance with the invention.
Figure 2:
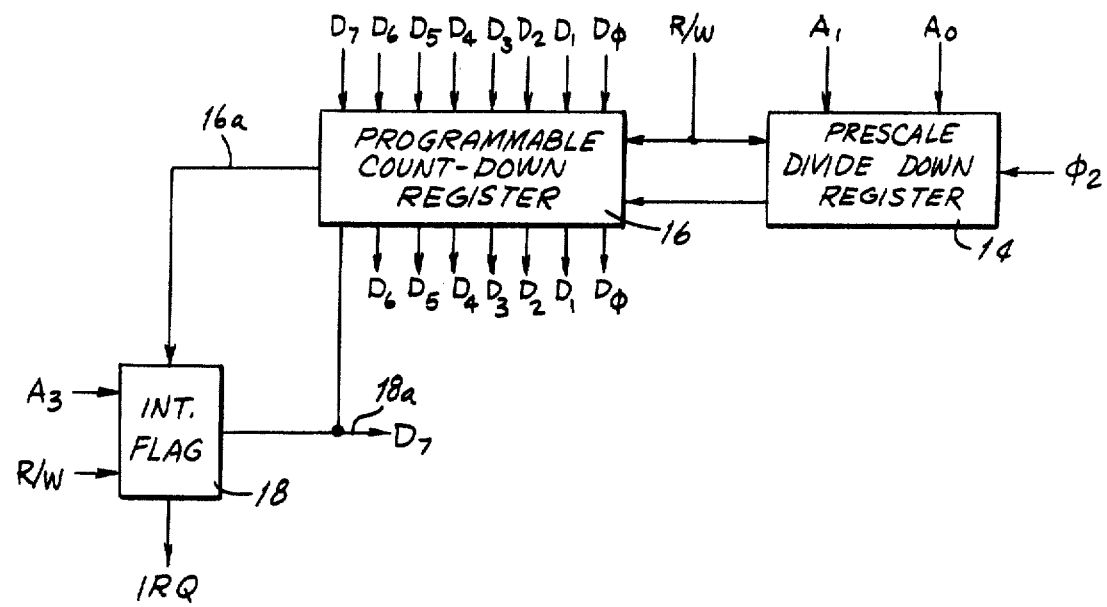
FIG. 2 is a partly circuit and partly block diagram of the elements of the interval timer most relevant to this invention.
Figure 3:
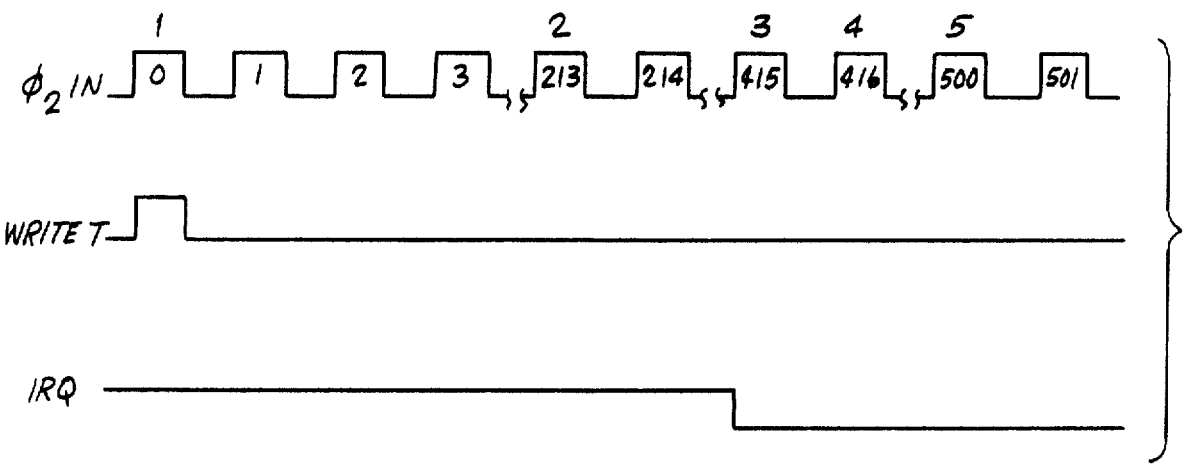
FIG. 3 is a timing diagram illustrating an example of an interrupt generated by the interval timer.

FIG. 1 illustrates a microprocessor system portion implemented on a single MOS IC chip and sold by MOS Technology, Inc., of Pennsylvania under the designation MCS 6530. The illustrated portion communicates with other portions of the 650X microprocessor system via an 8-bit data bus consisting of lines D0 through D7 and via a 10-bit address bus consisting of lines A0 through A9, as well as through the illustrated additional control lines. The microprocessor system and the portions thereof illustrated in FIGS. 1 through 3 are described in the following publications available from MOS Technology, Inc., Valley Forge, Pennsylvania, which are hereby incorporated by reference: (*MCS 6500 Microcomputer Family Hardward Manual*, Publication Number 6500-10, First Edition, MOS Technology, Inc., 1975; and MCS 6530 (*Memory, I/O Timer Array*), Preliminary Data Sheet, MOS Technology, Inc., dated August 1975, first published Sep. 15, 1975). For the purposes of this specification, it is only necessary to describe the interval timer illustrated at 10 in FIG. 1, and to note that it communicates with the local bus 12 of the system portion illustrated in FIG. 1, which in turn communicates with the system data bus, and that the interval timer additionally communicates with the two lowest order lines of the system address bus as well as with certain other lines of the system as discussed in connection with FIG. 2.

Referring to FIG. 2, the portions of the interval timer most relevant to the invention herein include a prescale divide down register 14, a programmable countdown register 16 and an interrupt flag register 18. The prescale register 14 receives as an input the system clock labelled $\phi_2$. In fact, the system has two complementary clocks, $\phi_1$ and $\phi_2$, and the clock applied to the register 14 happens to be the second one. The register 14 additionally receives as inputs the two lowest order system address bus lines, A0 and A1, and a read/write (R/W) control signal. The prescale divide down register 14 can be a conventional 10-stage binary counter (a modulo $2^{10}$ binary counter) counting the system clock pulses applied to it. Its output is tapped at the first, third, sixth and tenth stage, and only one of these taps is applied to the output of the register 14 at any one time, as selected by the state of the address lines A0 and A1. The selection can be through a suitable gating network (not shown) which may, for example, gate the taps as follows: (a) gate out the tap off the first stage when both A0 and A1 are low; (b) gate out the tap off the third stage when A0 is high and A1 is low; (c) gate out the tap off the sixth stage when A0 is low and A1 is high; and (d) gate out the tap off the tenth stage when both A0 and A1 are high. The programmable countdown register 16 may be a conventional 8-stage binary countdown register that can be loaded with an 8-bit binary number supplied to it over the data bus lines D0 through D7, and can count down from this initially supplied number in steps of one each time it receives a pulse from the register 14. The register 16 has output lines D0 through D7 which carry an 8-bit number indicating its contents. The register 16 can count down from the initially loaded positive number through zero to a negative number, and has provisions for being cleared for the loading of a new positive number. The register 14 can be cleared at the same time. The register 16 provides an output on line 16a to the interrupt flag register 18 when the number zero is in the register 16. The interrupt flag register 18 includes a single stage binary register and a gating network. This gating network (not shown) gates the high state of the interrupt flag register 18 onto the output line 18a when the address bus line A3 input into the register 18 is high, and enables the logical one set into the one stage register at 18 on an output line IRQ.

In operation, the programmable register 16 is loaded via the input data bus lines D0 through D7 with any selected number up to 255 and concurrently the address lines A0 and A1 are selectively enabled to select one of the divide factors of the register 14. When a full count is reached, i.e., when the programmable register 16 has counted down through zero, the interrupt flag at register 18 is set to a logic 1. After the interrupt flag is set, the register 16 continues counting down to a maximum of minus 255. Thus, after the interrupt flag is set the register 16 can be read to tell how long since the flag was set, up to a maximum of 255 system clock pulses.

As an example, if a count of 52 time periods is to be counted, where a time period is the period of the register 14 expressed in system clock pulses, the binary number 00110100 is loaded into the register 16. At the same time, one of the time factors 1, 8, 64 or 1,024 is decoded from address lines A0 and A1 to select the desired time period. Address line A3, if high during the loading operation, enables the interrupt flag onto lines 18a. Line 18a goes low when an interrupt occurs. When the register 16 is read out (nondestructively) prior to the interrupt flag being set, the number of time intervals remaining appears (i.e., 51, 50, 49, etc.). Should the register 16 be read when interrupt occurs, the value read would be 11111111. After interrupt, the register 16 decrements at a divide-by-one rate of the system clock $\phi_2$. If after interrupt the register 16 is read and a value of 11100100 is read, the time since counting down through zero is 28 time intervals. The value read is in two's complement notation.

Value read = 1 1 1 0 0 1 0 0
Complement = 0 0 0 1 1 0 1 1
ADD 1 = 0 0 0 1 1 1 0 0 = 28

Thus, to arrive at the total elapsed time the two's complement is added to the original time written into register 16. With a dividing factor of 8, the total time to interrupt is 52 × 8 + 1, or 417 time intervals. The total elapsed time would be 416 + 28, or 444 time intervals, assuming the value read from the register 16 after interrupt was 11100100. After interrupt, whenever the register 16 is read or loaded, the interrupt is reset. However, the reading of or writing into register 16 at the time interrupt occurs, does not reset the interrupt flag. When reading the register 16 after an interrupt, the address line A3 is kept low so as to disable the interrupt request on the line 18a. This is done to avoid future interrupts until after another loading of the interval timer.

Referring to FIG. 3, the first timing line illustrates the system clock, the second line illustrates the control signal on the line R/W shown in FIG. 2, and the third line illustrates the state of the IRQ output of the register 18 in FIG. 2 for the loading of the programmable register 16 indicated at FIG. 2.

Should register 16 be read at the times designated by the numbers 1 to 5 in FIG. 3, it would contain the following binary numbers:

1. 00110100 — This is the binary equivalent of decimal number 52, to which the register 16 has been preset in this example.

2. 00011001 — This is the binary equivalent of decimal number 25, to which the register 16 has counted down at time 213, using a dividing factor of 8.

3. 00000000 — This zero-value, to which the register 16 has advanced from its preset value of 52, signifies that the desired interrupt time is impending and will occur upon receipt of the next clock pulse $\phi_2$, i.e. at time 416, since 416 divided by 8 equals the preset value 52.

4. 11111111 — This full-value count (of binary 255) follows the zero-value, as the register 16 is advanced by the next clock pulse $\phi_2$. It occurs at the time the interrupt is taking place.

5. 10101100 — This is the binary two's complement equivalent of decimal number 84, to which the register 16 has counted down at time 500, since the divider factor of 8 is no longer operative once interrupt occurs.

I claim:

1. An interval timer for a microprocessor system having a plurality of data bus lines, a plurality of address bus lines and a clock, said interval timer comprising:

a prescale divide-down register receiving the clock and providing a selectable one of a plurality of outputs which are divisions of the clock by non-contiguous powers of two;

means for applying a subset of the address bus lines to the prescale register to select one of said outputs thereof;

a countdown register;

means for loading the countdown register with a selected number through the data bus lines;

means for applying the selected output of the prescale register to the countdown register to cause a countdown of said number loaded therein;

an interrupt flag register; and means for loading the interrupt flag register when the countdown register reaches the count of zero.

2. An interval timer for a microprocessor system having a plurality of data bus lines, a plurality of address bus lines and a clock providing clock pulses at a uniform rate, said interval timer comprising:
   a prescale divide-down register receiving the clock pulses and providing a selectable one of a plurality of outputs which are pulses at rates which are divisions of the clock rate by noncontiguous powers to two;
   means for applying a subset of the address bus lines to the prescale register to select one of said outputs thereof;
   a counting register;
   means for applying the selected output of the prescale register to the counting register to cause the counting register to count the pulses provided at the selected output of the prescale register;
   an interrupt flag register; and
   means for loading the interrupt flag register when the counting register reaches a selected count.

* * * * *